US006807980B2

(12) United States Patent
Liao

(10) Patent No.: US 6,807,980 B2
(45) Date of Patent: Oct. 26, 2004

(54) STRUCTURE OF THE SELF-MIXING SYSTEM OF HYDRAULIC GIANT

(76) Inventor: Yu Chung Liao, P.O. Box 63-150, Taichung (406) (TW)

( * ) Notice: Subject to any disclaimer, the term of this patent is extended or adjusted under 35 U.S.C. 154(b) by 0 days.

(21) Appl. No.: 10/389,941

(22) Filed: Mar. 18, 2003

(65) Prior Publication Data

US 2004/0079413 A1 Apr. 29, 2004

(30) Foreign Application Priority Data

Nov. 27, 2002 (TW) ..................................... 91219335 U

(51) Int. Cl.[7] ............................................... B01D 11/02
(52) U.S. Cl. ....................................... 137/268; 422/264
(58) Field of Search .......................... 137/268; 422/263, 422/264

(56) References Cited

U.S. PATENT DOCUMENTS 1,786,561 A * 12/1930 Collenburg ................. 422/263
2,058,901 A * 10/1936 McPherson ................. 137/268
4,572,235 A * 2/1986 Katzer et al. ............... 137/268
5,954,272 A * 9/1999 Liao ........................... 239/317

* cited by examiner

*Primary Examiner*—Kevin Lee

(57) ABSTRACT

A hydraulic giant, with an inlet pipe and an outlet pipe in its body, which are connected through an axle hole; at the terminal of inlet pipe, there is a blocking cove, which leans upward with a water-distribution hole on the bottom side for downward water distribution from the inlet pipe. There is a guiding hole beneath the intersection of outlet pipe and inlet pipe, on top of which is a regulating valve for flow control. A globe valve switch for controlling water input being installed in the head end portion of the inlet pipe, where will be followed by the connection of a water hose or a further appliance. A tubular cleaning solution container, which is removed freely and is set below the water-distribution hole and guiding hole on the body of hydraulic giant for containing cleaning solution. Through above combinations, the globe valve switch is used to control water input and the regulating valve is used to drive and control the axial direction flow of the guiding hole, thus to adjust the flow speed of downward distributed water flows, and thus the mixing proportion of cleaning solution with fresh water is more effectively regulated and controlled.

7 Claims, 7 Drawing Sheets

STRUCTURE OF THE SELF-MIXING SYSTEM OF HYDRAULIC GIANT

BACKGROUND OF THE INVENTION

1. Field of the Invention

This invention relates to the structure of a hydraulic giant, and more specifically, it relates to an improved structure of the mixing system of a hydraulic giant, which is used to promote the mixing efficiency of cleaning solution.

2. Description of the Prior Art

A hydraulic giant with prior art puts cleaning solution inside for the convenience of usage, and uses water flows to mix cleaning solution automatically. Referring to FIG. 1, it relates to U.S. Pat. No. 4,785,850, wherein vertical control valve (1) is used to control water inlet (2) and water outlet (3). Besides allowing water to flow horizontally, an airtight cleaning solution container (4) is put below to supply cleaning solution, which is provided with small axle holes (4A) (4B) that are connected with water inlet (2) and water outlet (3) respectively. By dint of the pressure difference resulted from height of water flows, the pressure at water inlet (2) brings water inside cleaning solution container (4) via small axle hole (4A); the mixed water flows will be guided out through another small axle hole (4B); there is no effective control of cleaning water release in this structure, thus the self-mixing result can't be achieved truly. With water being brought into cleaning solution container (4), the cleaning solution is diluted and wasted without being mixed fully, and the application effect is not satisfying.

Whereas, the inventor originated this invention through study and test with great concentration and by combining years of experience of production and distribution of like products.

SUMMARY OF THE INVENTION

The purpose of this invention is to offer an improved structure of the self-mixing system of a hydraulic giant, which is used to mix cleaning solution fully automatically and more efficiently, thus the hydraulic giant is more convenient to be used.

Thus, an improved structure of the mixing system of a hydraulic giant is invented, comprising:

- a hydraulic giant, with an inlet pipe and an outlet pipe in its body, which are connected through an axle hole; at the terminal of inlet pipe, there is a blocking cove, which leans upward with a water-distribution hole on the bottom side for downward water distribution from the inlet pipe. There is a guiding hole beneath the intersection of outlet pipe and inlet pipe, on top of which is a regulating valve for flow control;
- a tubular cleaning solution container, which is removed freely and is set below the water-distribution hole and guiding hole on the body of hydraulic giant for containing cleaning solution;
- a globe valve switch for controlling water input, which is installed in the positioning cove, where in the head end portion of the inlet pipe, where will be followed by the connection of a water hose and a further appliance.

Through above combinations, the globe valve switch of the inlet pipe is used to control the water input and the regulating valve on the top of the guiding hole is used to drive and control the axial direction flow of the guiding hole, thus to adjust the flow speed of downward distributed water flows, and thus the mixing proportion of cleaning solution with fresh water is more effectively regulated and controlled.

The foregoing aspects and many of the attendant advantages of this invention will become more readily appreciated as the same becomes better understood by reference to the following detailed description, when taken in conjunction with the accompanying drawings, wherein:

DESCRIPTION OF THE PREFERRED EMBODIMENT

Figure 1:
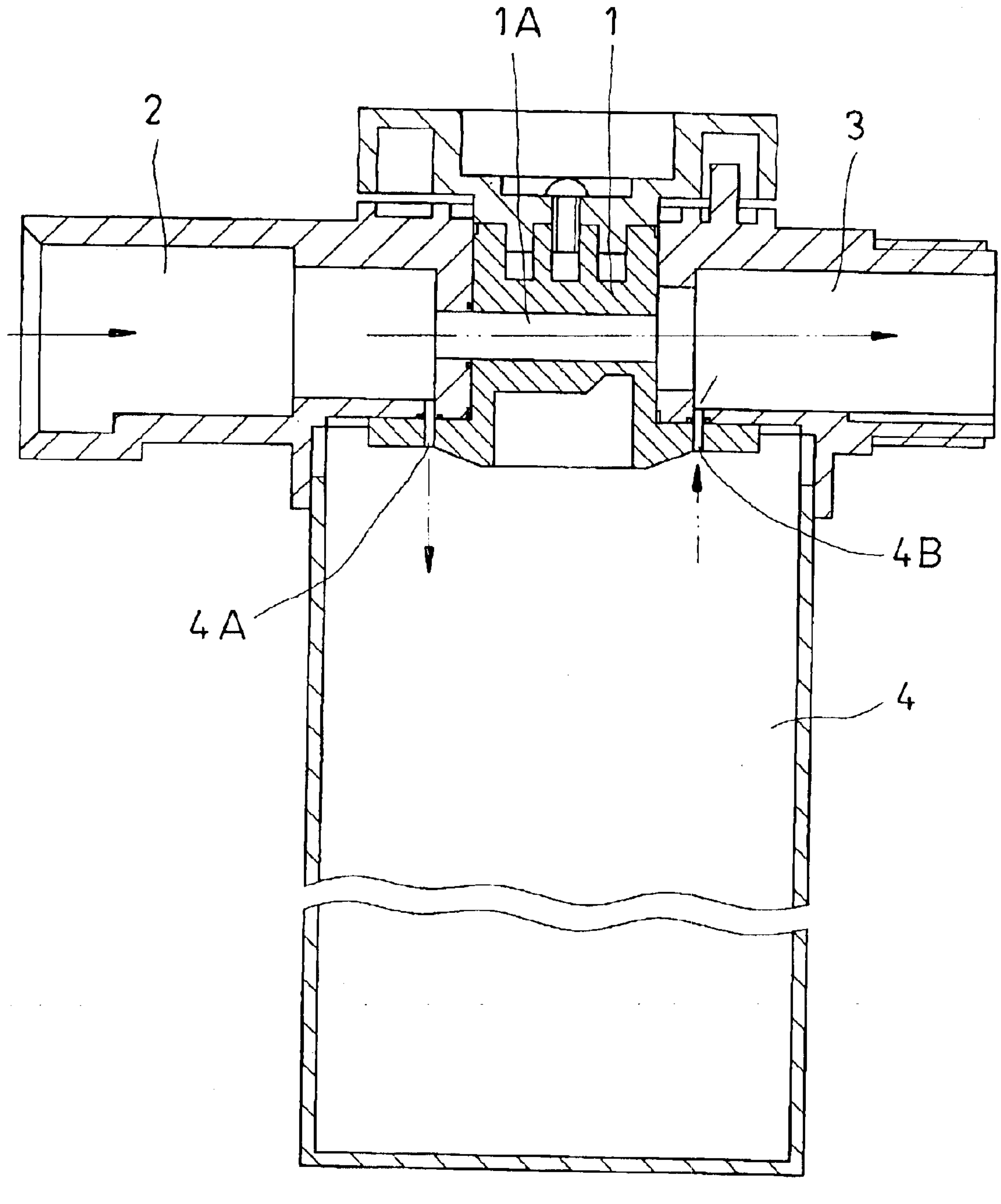
FIG.1 PRIOR ART
FIG. 1 is the sketch map of the structure of mixing system of hydraulic giant with prior art.
Figure 2:
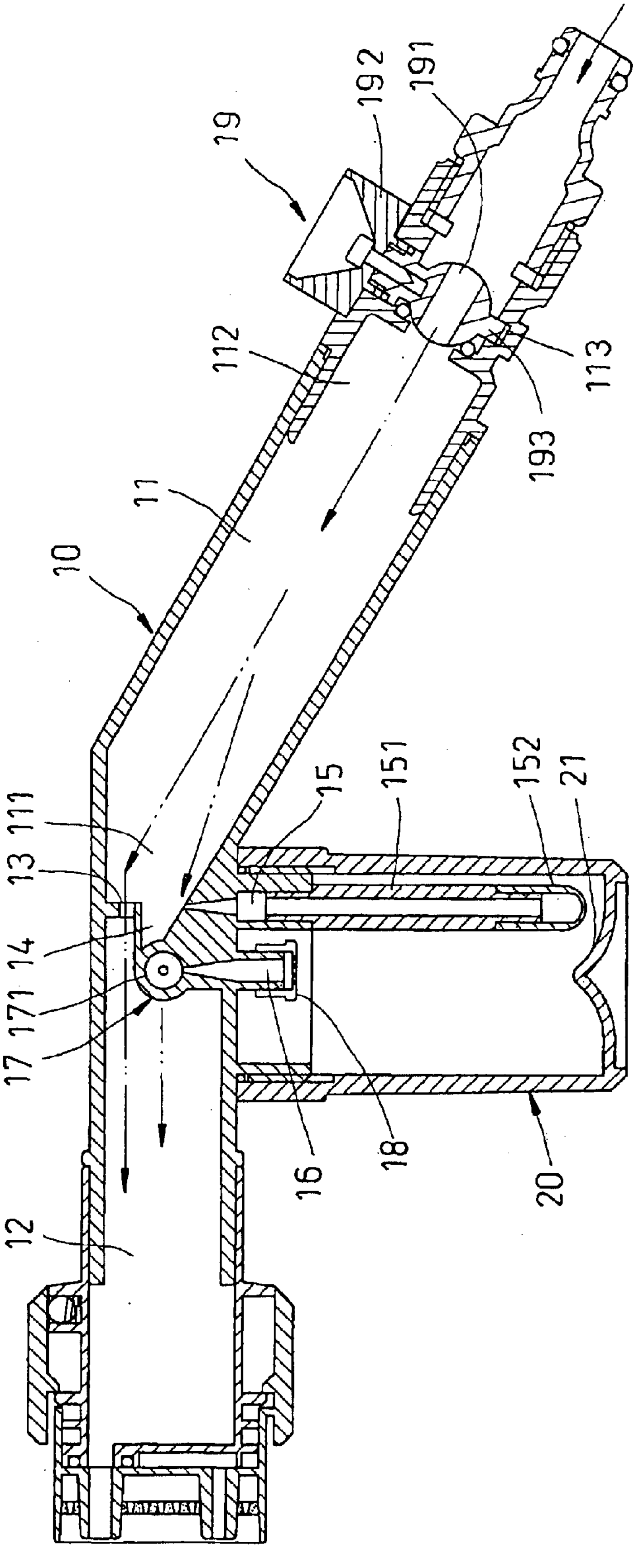
FIG. 2 is the front vertical cutaway view of an application of this invention.
Figure 3:
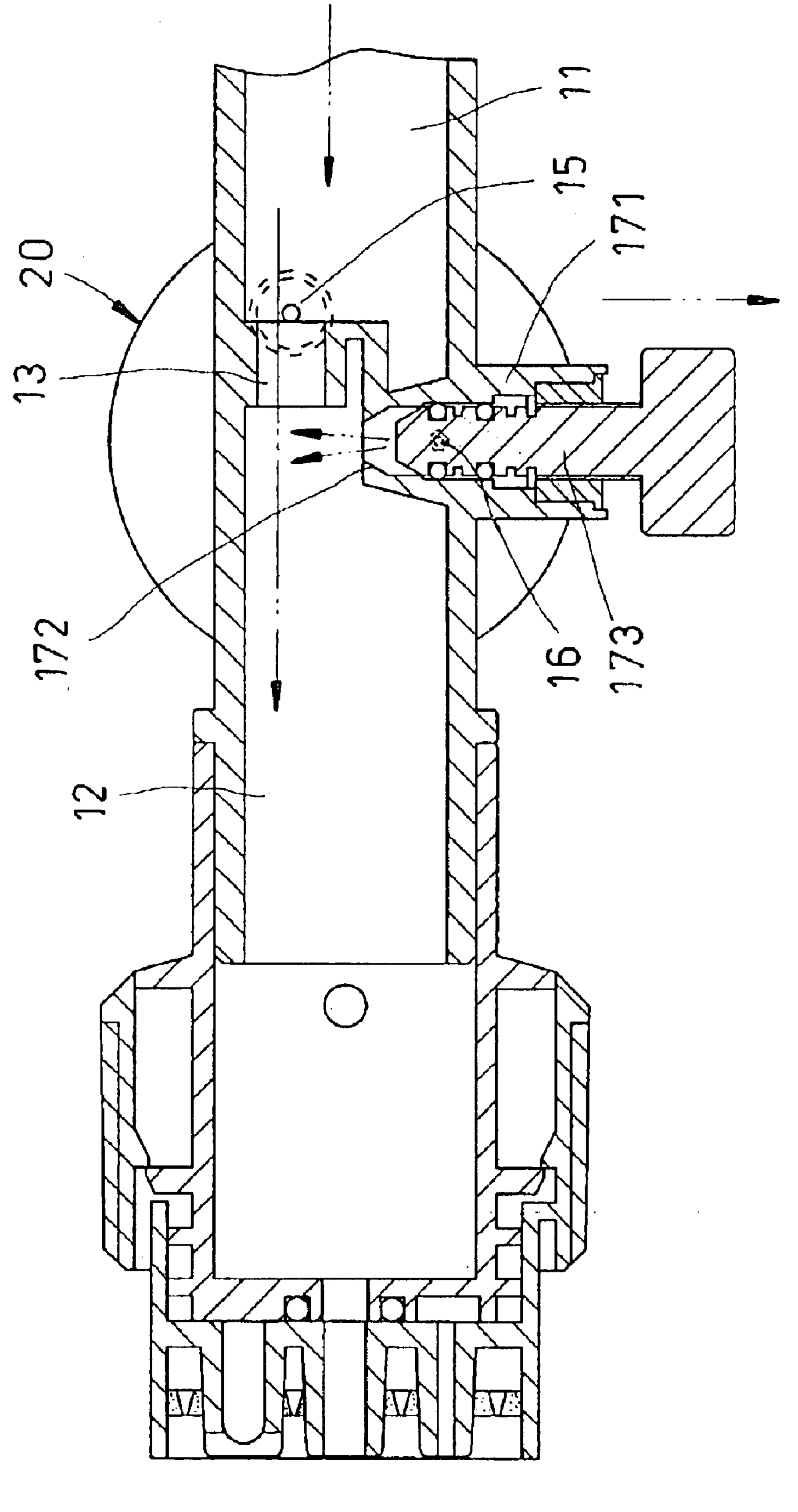
FIG. 3 is a partial cross cutaway view of an application of this invention from a top angle.

First of all, referring to FIG. 2 and FIG. 3, this invention relates to an improved structure of the mixing system of a hydraulic giant, comprising: a hydraulic giant body (10); a cleaning solution container (20), and a glove valve switch (19), wherein There are an inlet pipe (11) and an outlet pipe (12) in the body of hydraulic giant (10), which are connected through axle hole (13); at the terminal (111) of inlet pipe (11), there is a blocking cove (14), which leans upward with a water-distribution hole (15) on the bottom side for distribution of water from inlet pipe (11). At the bottom end of the water distribution hole (15), there is a jet flow pipe (151) with a one-way valve sheath (152) at its bottom to maintain the one-way transport of clean water in the pipe; in addition, there is a guiding hole (16) beneath the intersection of outlet pipe (12) and inlet pipe (11), on top of which is a regulating valve (17) for flow control that is composed of a tapered chamber (171) formed by extending the top of guiding hole (16) horizontally. This tapered chamber (171) has an outlet that connects the inside of outlet pipe (12). The tapered chamber is provided with a tapered valve (173) inside for control or regulate the axial direction flow of guiding hole (16). The bottom of guiding hole (16) is provided with a filter screen (18) in form of a bell socket;

In addition, there is a positioning cove (113) being recessed inside the diameter of the head end portion (112) of the inlet pipe (11), where will be followed by the connection of a water hose or a further appliance. The positioning cove (113) will be installed a globe valve switch (19) for controlling of water input. The globe valve switch comprising: a globe valve (191); a driving knob (192) on top of the globe valve (191); and a positioning axle (193) under the globe valve (191), for fitting the positioning cove (113). Thus the globe valve switch (19) is fixed and the water pressure inside the pipe remain firm and the pipe is leak resistant.

Figure 4:
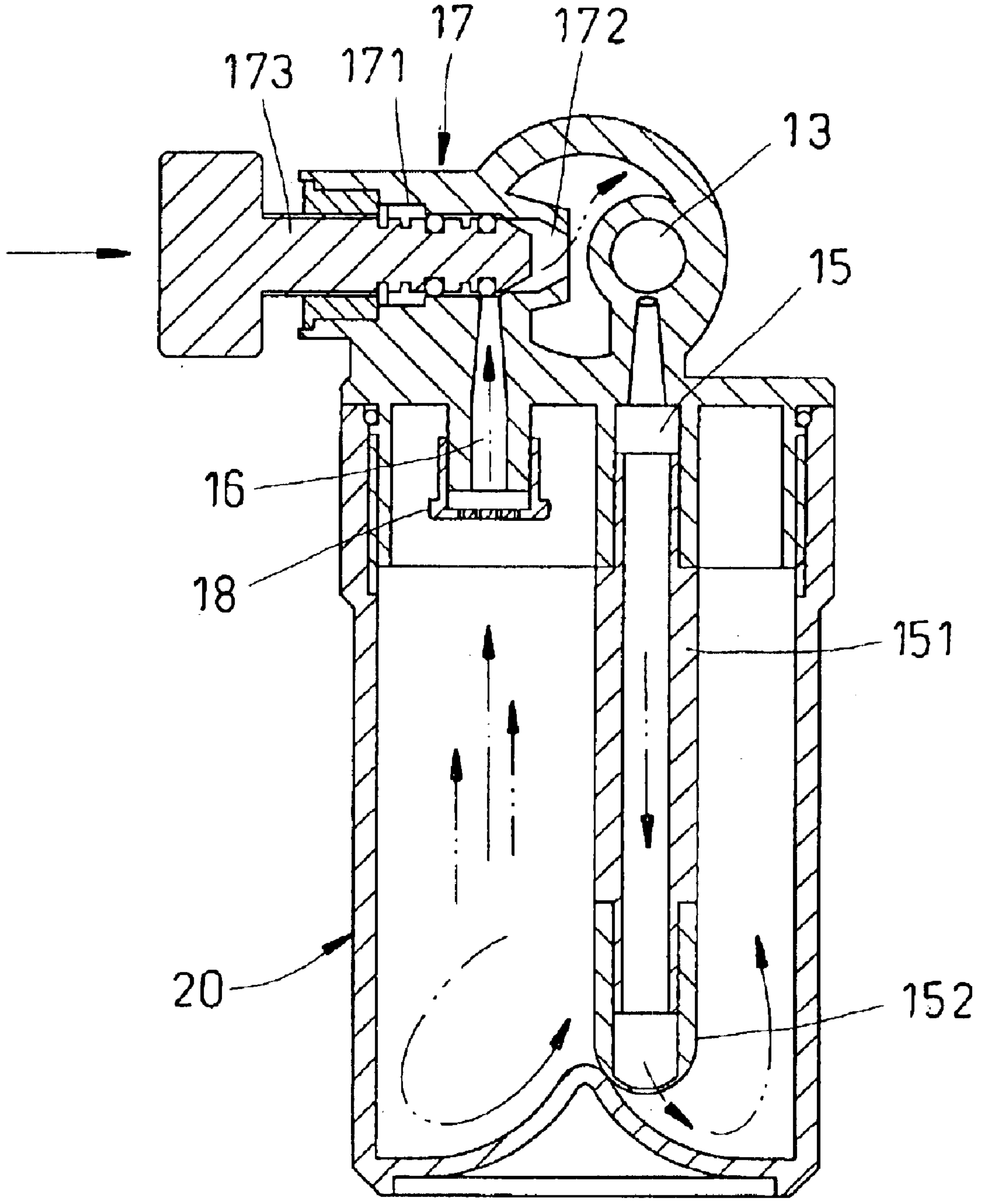
FIG. 4 is a partial vertical cutaway view of an application of this invention from an side angle.

A tubular cleaning solution container (20), which is set below the water-distribution hole (15) and guiding hole (16) on the body of hydraulic giant (10) for containing cleaning solution. An arched guiding part (21) is set on the bottom of the container for promoting the efficiency of downward water guidance through water-distribution hole (15) and for promoting the mixing efficiency of cleaning solution;

As mentioned above, this invention relates an improved structure of the self-mixing system of a hydraulic giant, wherein a globe valve switch is used to control the water input and a regulating valve is used to control the axial direction flow of the guiding hole, thus to adjust the flow speed of downward distributed water flows, and to promote the efficiency of water adjustment and control in mixing cleaning solution with clean water. Referring to FIG. 2 and FIG. 3, when driving the driving knob (192) of the globe valve switch (19) to open the globe valve (191), while water input into the inlet pipe (11) is blocked by the blocking cove (14) when reaching the terminal and is divided into two parts; referring to FIG. 3, one way of the water enters outlet pipe (12) directly through axle hole (13), while the other way of water gathers downward at water-distribution hole (15) due to being blocked at blocking cove (14), and then under the pressure resulted from opening the regulating valve (17)(referring to FIG. 3), clean water that enters water-distribution hole (15) reaches the bottom of cleaning solution container (20) automatically. Referring to FIG. 4, the ingoing water rises quickly under the guidance of arced guiding part (21), and is mixed with cleaning solution well, then the cleaning solution is brought upward into the outlet pipe (12) through guiding hole (16), and is mixed with another way of water that goes directly into outlet pipe (12) through axle hole (13); wherein, there is a regulating valve (17) on top of guiding hole (16), referring to FIG. 3 and FIG. 4, the flow of cleaning solution is controlled through adjusting the water passage spacing by moving the tapered valve (173) in tapered chamber (171), and thus a better water supply proportion is offered for cleaning solution.

Figure 5:
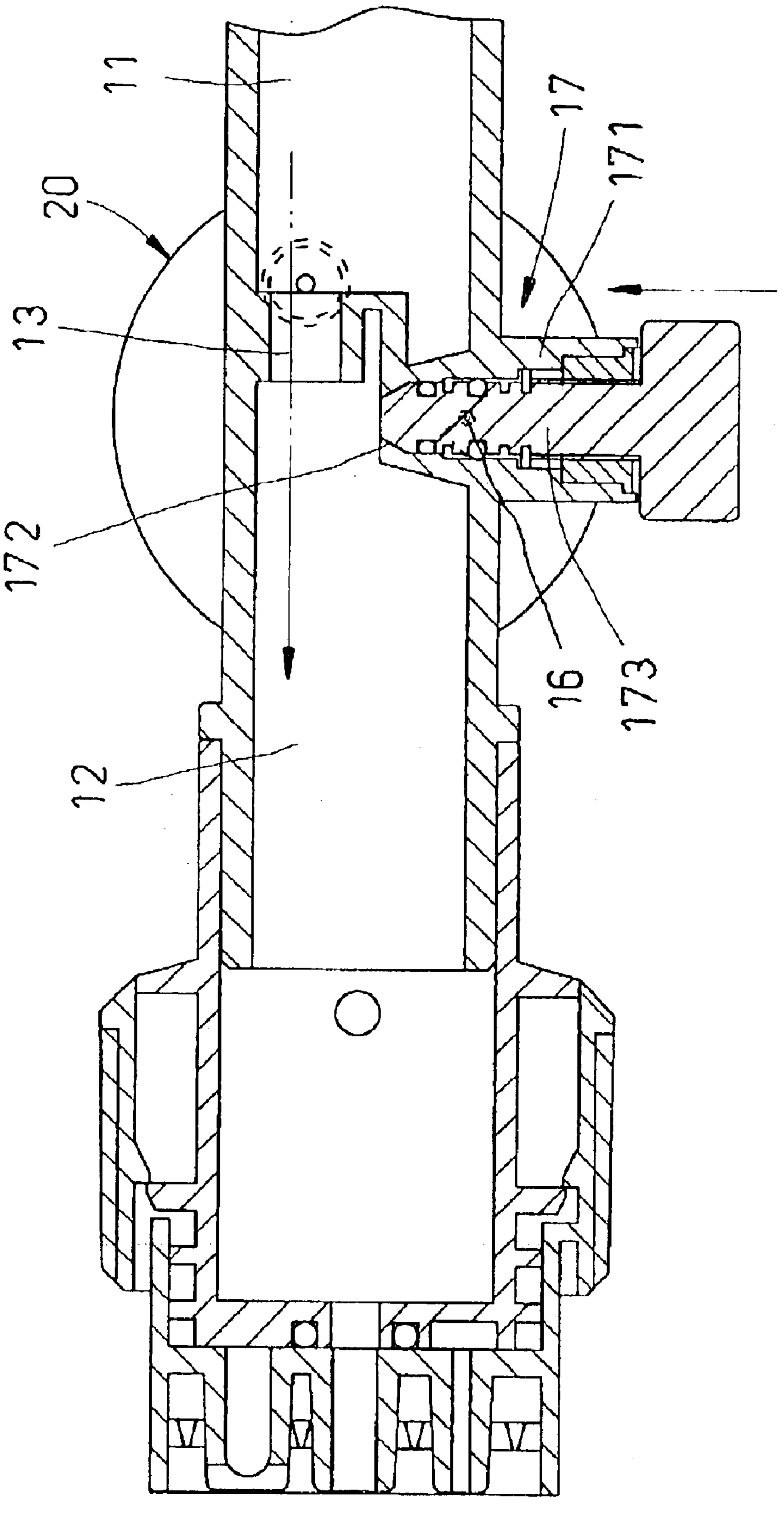
FIG. 5 is a partial cross cutaway view of this invention from a top angle when the cleaning solution is shut off.
Figure 6:
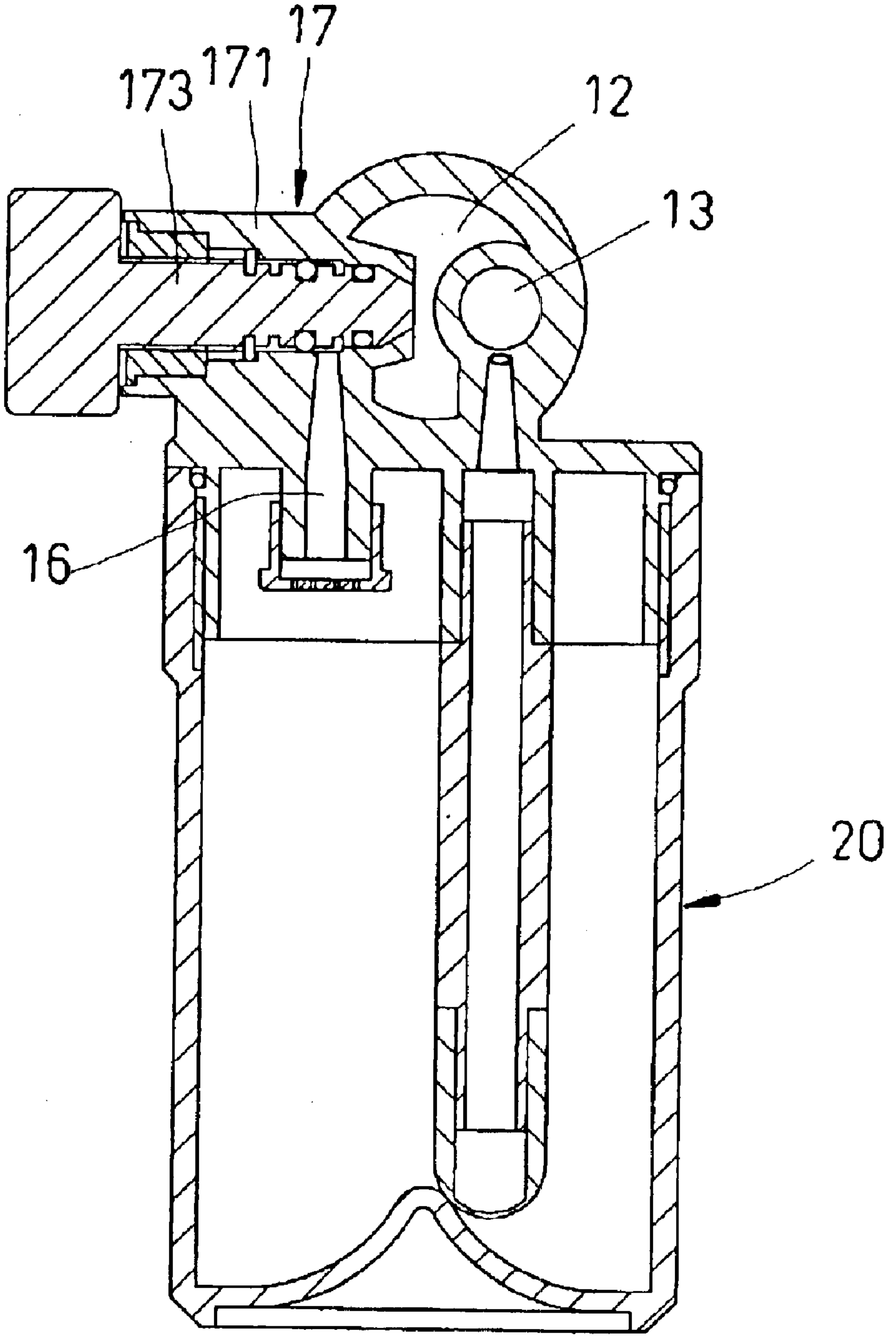
FIG. 6 is a partial vertical cutaway view of this invention from a side angle when the cleaning solution is shut off.

In addition, when we want to use clean water only, referring to FIG. 5 and FIG. 6, screw the regulating valve (17) to make the outside diameter of tapered valve (173) fit the wall of tapered chamber (171), and to confine the cleaning solution in container (20), thus water can't get in through water-distribution hole (15), and thus water in inlet pipe (11) flows to outlet pipe (12) horizontally through the only axle hole (13).

Figure 7:
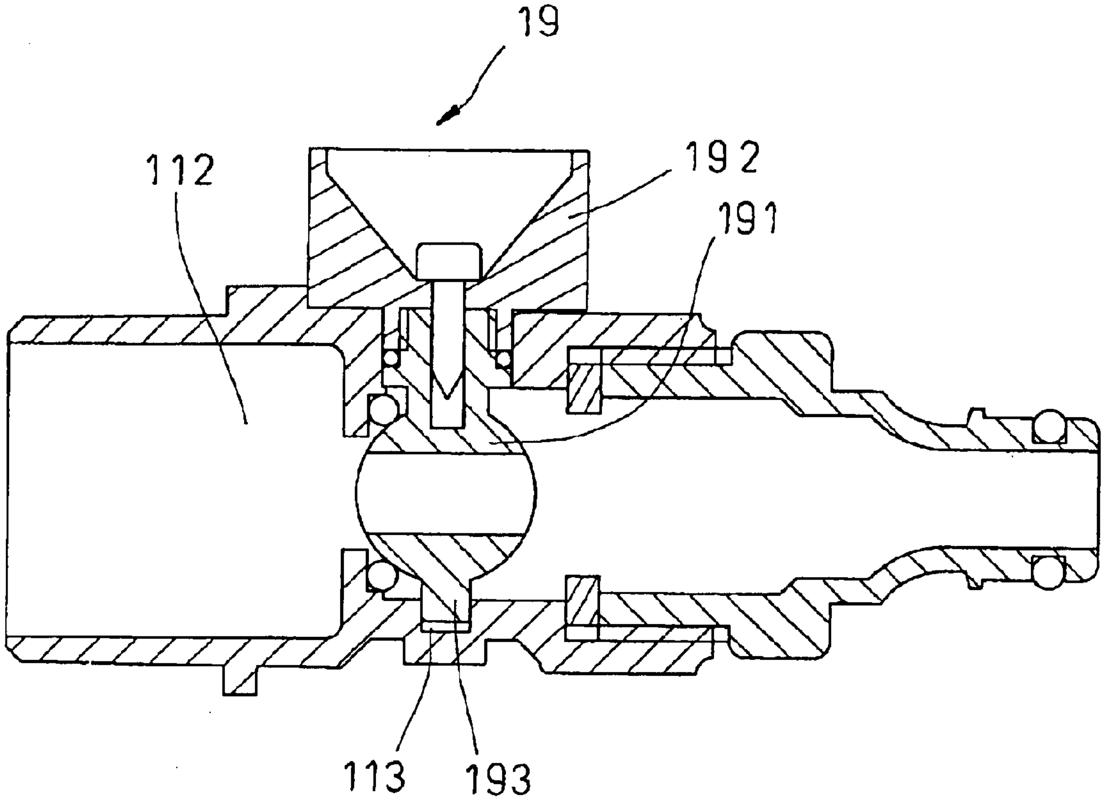
FIG. 7 is the magnified front vertical cutaway view of the clean water switch structure of this invention.

When we want to stop operations, referring to FIG. 7, break the inlet pipe (11) by driving the globe valve switch (19) to close the globe valve (191) with the driving knob (192), thus the input of water is stopped; what is worthy of mentioning here is that the setting of the globe valve switch (19) in this invention is different from that in prior art, there is a positioning (193) at the bottom of the globe valve (191), which is used to position the globe valve (191) by fitting the positioning cove (113). When it is closed, the water pressure in the pipe is stable, and there are not such cases of hanging of bottom of global valve (191), insufficient holding power and so on.

All in all, this invention relates to an improved structure of the self-mixing system of a hydraulic giant. Its reformed form enables us to adjust the mixing proportion of cleaning solution of hydraulic giant properly, independent water operation without cleaning solution is also available, and water loss is reduced to the most through controlling water inflow switch valve. There is no doubt of its practicality, and there is no like product or similar structure released before, thus we present this patent application to your administration according to the patent law.

What is claimed is:

1. An improved structure of the self-mixing system of a hydraulic giant, comprising:

a hydraulic giant, with an inlet pipe and an outlet pipe in its body, which are connected through an axle hole; at the terminal of the inlet pipe, there is a blocking cove, which leans upward with a water-distribution hole on the bottom side for downward water distribution from the inlet pipe; there is a guiding hole beneath the intersection of the outlet pipe and the inlet pipe, on top of which is a regulating valve for flow control;

a globe valve switch for controlling water input, which is installed in the positioning cove, where in the head end portion of said inlet pipe, where will be followed by the connection of a water hose or a further appliance;

a tubular cleaning solution container, which is set below the water-distribution hole and guiding hole on the body of hydraulic giant for containing cleaning solution;

a glove valve switch is used to control the water input and said regulating valve is used to control the axial direction flow of the guiding hole, thus to adjust the flow speed of downward distributed water flows, and to promote the efficiency of water adjustment and control in mixing cleaning solution with clean water.

2. The improved structure of the self-mixing system of a hydraulic giant according to claim 1, wherein said blocking cove at the inlet pipe terminal is of a up-leaning type, which is used to promote the efficiency of downward water-distribution through the water-distribution hole.

3. The improved structure of the self-mixing system of a hydraulic giant according to claim 1, wherein said water-distribution hole is of a taper form with a jet flow pipe on its bottom; there is one-way valve sheath at the bottom of the jet flow pipe to prevent the backflow of cleaning solution in the container.

4. The improved structure of the self-mixing system of a hydraulic giant according to claim 1, wherein there is an arched guiding part on the bottom of said cleaning solution container for enhancing the water guidance through the water-distribution hole and for promoting the mixing efficiency of cleaning solution with water.

5. The improved structure of the self-mixing system of a hydraulic giant according to claim 1, wherein the bottom of said guiding hole of the outlet pipe is provided with a filter screen for a bell socket.

6. The improved structure of the self-mixing system of a hydraulic giant according to claim 1, wherein the top of said guiding hole is a tapered chamber formed through lateral expansion, which is provided with a outlet to the inside of said outlet pipe, and a tapered valve is set inside that is moved along the axial direction.

7. The improved structure of the self-mixing system of a hydraulic giant according to claim 1, wherein said positioning cove being recessed inside the diameter of said head end portion of said inlet pipe, where will be followed by the connection of a water hose or a further appliance, wherein said positioning cove will be installed said glove valve switch for controlling of water input, wherein said globe valve switch comprising: a globe valve; a driving knob on top of said globe valve; and a positioning axle under said globe valve for fitting said positioning cove, thus to stabilize the globe valve switch, to keep the water pressure firm in the pipe, and to remain leak resistant.

* * * * *